3,440,227
POLYMERIZATION OF HIGHER LACTAMS
Bernard O. Baum, Wilmington, Del., assignor to The Budd Company, Philadelphia, Pa., a corporation of Pennsylvania
Continuation-in-part of application Ser. No. 511,435, Dec. 3, 1965. This application Mar. 31, 1966, Ser. No. 552,658
Int. Cl. C08g 20/10, 20/12
U.S. Cl. 260—78     14 Claims

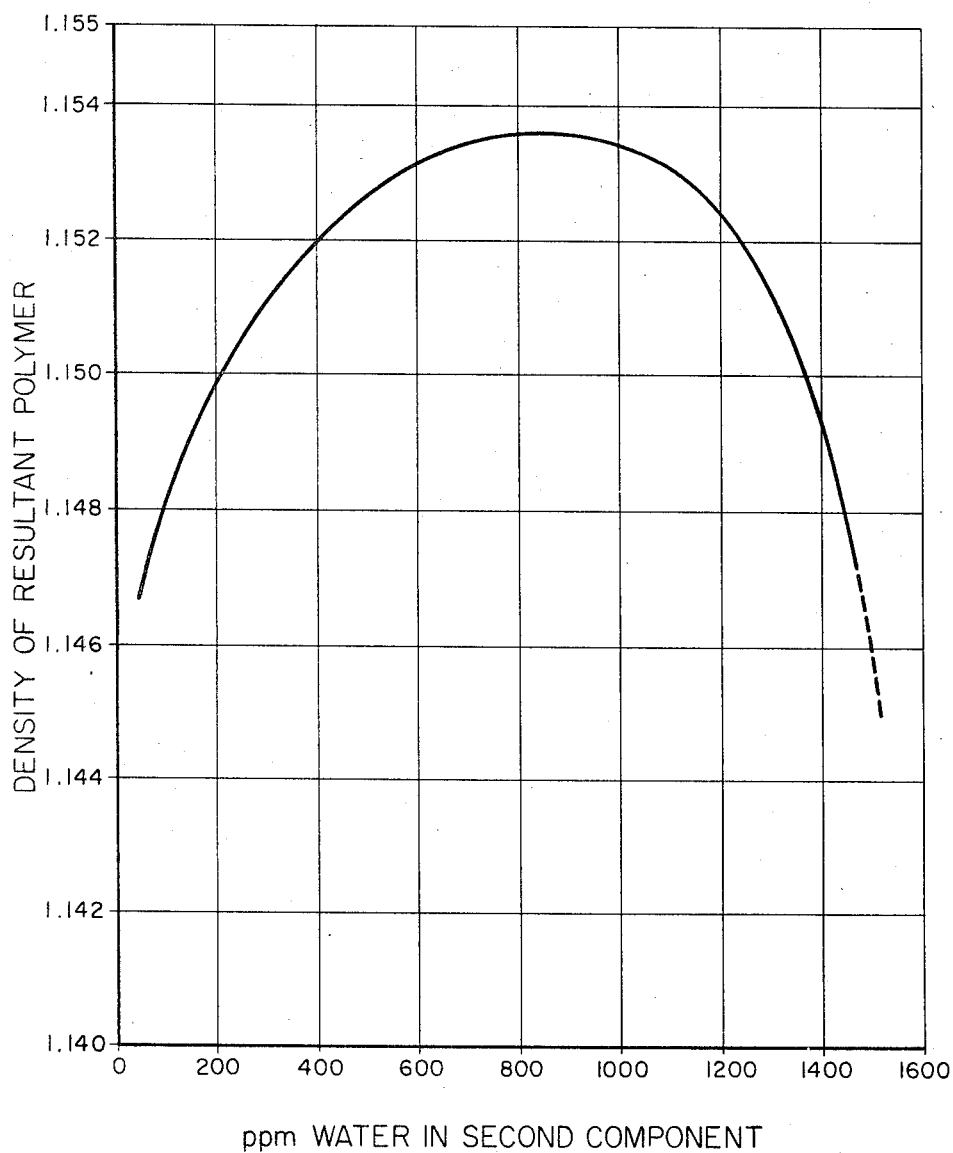

ABSTRACT OF THE DISCLOSURE

Polyamides of higher molecular weight are obtainable by anionic polymerization of higher lactams in the presence of a promoter formed in situ by the reaction of an organic isocyanate and water in the presence of lactam by addition of isocyanate to liquid monomer containing from 200 to 1400 p.p.m. of water. The amount of isocyanate added is in slight excess of that required to reduce the water content of the monomer below 50 p.p.m.

---

This invention relates to a novel process for the polymerization of lactams to useful high molecular weight polyamides which are suitable for production of shaped cast items, coatings and the like. This application is a continuation-in-part of application Ser. No. 511,435 filed Dec. 3, 1965, now abandoned.

The polymerization of caprolactam to the polyamide known as nylon 6 is well known. Acidic materials and water were the first catalyst suggested for polymerization of lactams. The acidic materials and water opened the lactam ring and thereafter a condensation reaction occurred which produced the polymer. However, this method was found to have several disadvantages. The initial reaction required the use of rather high pressures. In addition the polymerization rate was rather slow and required hours and even days to obtain a polymer having a sufficiently high degree of polymerization to be useful.

Later the polymerization of capralactam and other omega lactams was found to occur more rapidly in the presence of basic material, particularly alkali and alkaline earth metals and their compounds, and became known as aionic polymerization.

A primary use of anionically polymerized polyamides is to form in situ articles of rather large dimensions. Initially such anionic polymerization required reaction temperatures higher than the melting point of the resulting polymers, and considerable amounts of low molecular weight liquid polymer were trapped in the polymer product. This somewhat limited the utility of the process for the presence of the liquid polymer caused stresses and flow patterns in the finished article, which adversely affected its quality and dimensional stability. In addition, the rather high polymerization temperatures limited the availability of the molds because each mold had to be cooled for a relatively long period of time to reduce the temperature to a point where the molded part could be safely removed.

Because of these and other difficulties that were encountered, certain materials were developed which act in conjunction with the base catalysts to reduce the polymerization temperature below the melting point of the polymer and to increase the rate of polymerization. For example, these materials, commonly known as promoters, reduce the reaction temperature to about 100° to 175° C. and polymerization time to about 20 minutes to an hour.

However, the promoters used heretofore have not been completely satisfactory. Anionic polymerization reactions with or without a promoter are extremely easy to poison. The major source of contamination is water. Water, even when present in relatively small amounts, reacts with the basic polymerization catalyst and deactivates it, thereby interfering with polymerization. The mechanism of anionic polymerization involves the reaction between the base catalyst and lactum to form the salt of the lactum. The salt of the lactam thereafter becomes the catalyst and initiates the chain forming reaction which produces the polymer. However, even if the salt has formed, water will react with the salt, deactivating the catalyst.

For this reason anionic polymerization of lactams, such as epsilon caprolactam, has required the use of essentially anhydrous monomer, which increased the raw material cost. Since it is not commercially feasible to produce truly anhydrous lactams, lactam monomer containing less than 50 part per million of water became known in the industry as "anhydrous." Accordingly, the term "anhydrous" as used in this specification will denote a lactam monomer containing less than about 50 parts per million of water.

In addition, using the prior known catalyst-promoter systems, there was an upper limit on the density of the molded part that could be obtained within a commercially feasible polymerization time. Density is directly related to the degree of polymerization that has been obtained, the greater the density the higher the molecular weight of the polymer.

In situ polymerized nylon is used mainly for mechanical application where high strength and resistance to wear are essential properties. Since these desirable properties are directly related to density, it is preferable to obtain as high a density as possible. For many applications, the lower density polymers produced by the prior known methods were either unacceptable or marginal in quality.

It is a primary object of this invention to provide a novel process for polymerization of lactams, especially epsilon caprolactam, to obtain higher density polymers from which parts of increased hardness, strength and wear resistance may be farbricated.

Another object of this invention is a process for the polymerization of lactams using a novel catalyst-promoter system.

A further object of this invention is to provide a process for the polymerization of lactams which has less sensitivity to water than prior systems.

Still another object of this invention is to provide a process by which lactams having relatively high moisture content can be polymerized rapidly to high density polymers.

These and other objects and advantages of the present invention will become further apparent to those skilled in the art by reference to this specification and appended claims.

Briefly, the objects of this invention may be obtained by the novel process of this invention wherein a lactam having from 3 to 12 carbon atoms in the lactam ring, for example ε-caprolactam, is heated in the presence of a lactam-base salt and a promoter comprising the reaction product of an organic isocyanate and water. Advantageosuly, a second or co-promoter, such as triphenoxytriazine, may be used in conjunction with the promoter comprising the reaction product of an organic isocyanate and water.

It is well known in the plastics art that a relatively small change in the density of a polymer can result in a rather substantial change in the physical properties of the polymer. For example, in ethylene polymers the difference in density between "low" and "high" density polyethylene is only a few percent; however, the physical properties of the respective polymers are distinctly different. This same relationship between density and physical properties is also exhibited by polyamides. Since certain physical properties of polyamides improve with increasing dennsity it is desirable to obtain higher density polymers for mechanical applications.

An illustration of the improvements which can be obtained by the novel polymerization process of this invention is given in Table I, where the physical properties of a polyamide having a density of 1.147 are compared with those of a polyamide having a density of 1.153 prepared by the process of this invention. In each instance the monomer was ε-caprolactam and the catalyst a salt of ε-caprolactam obtained with lithium hydride. The promoter use in preparing the lower density polymer was toluene diisocyanate, while that used in preparing the higher density polymer was the reaction product of toluene diisocyanate (TDI) and water (0.09% of TDI, based on total weight of polymer to be polymerized which contained 600 p.p.m. water).

TABLE I.—PROPERTIES VS. DENSITY

| Property | ASTM-D | | |
| --- | --- | --- | --- |
| Density | 792 | 1.147 | 1.153 |
| Tensile at yield (p.s.i.) | 638 | 9,400 | 12,800 |
| Room temp. strength (p.s.i.) | | 10,600 | 12,800 |
| Ultimate elong. (percent) | | 50 | 20 |
| Tensile modulus (p.s.i.) | | 410,000 | 540,000 |
| Flex. strength, 73° F. (p.s.i.) | 790 | 12,300 | 16,500 |
| Flex. modulus, 73° F. (p.s.i.) | | 350,000 | 505,000 |
| Compressive at— | | | |
| Yield (p.s.i.) | 695 | 8,875 | 13,400 |
| 1% offset (p.s.i.) | | 10,125 | 14,000 |
| Comp. modulus (p.s.i.) | | 273,000 | 415,000 |
| Rockwell hardness | 785 | 111 | 116 |

As noted above, the prior known processes for the anionic polymerization of lactams to polyamides required the use of "anhydrous" monomer. A further advantage of the present invention is that it makes possible the use of monomer containing substantial quantities of water. Thus, the process of this invention, in addition to providing higher density polymers of improved physical properties, is cheaper to carry out since costly purification procedures to reduce the water content of the monomer below about 50 p.p.m. are not required as regards that portion of the monomer to which isocyanate is added. The manner in which monomer containing an amount of water considerably in excess of the maximum permitted in "anhydrous" monomer is discussed more fully hereinafter.

This invention will be described with specific reference to polymerization of epsilon caprolactam using a salt thereof formed with lithium hydride as the base catalyst and the reaction product of toluene diisocyanate and water as the promoter. However, it should be understood that the teachings of this invention are not limited to any particular lactam, catalyst or organic isocyanate.

Lactams suitable for polymerization according to the process of this invention are omega lactams having from three to twelve carbon atoms in a lactam ring. These lactams may be divided into two general classes, lower lactams having four but less than six carbon atoms in the lactam ring, and higher lactams having six to twelve carbon atoms in the lactam ring. This classification is based on end use of the polymer and on polymerization conditions. The polymerized lower lactams may be used for highly specialized applications, such as blood additives, while the polymerized higher lactams may be used in mechanical applications such as in the fabrication of gears, slipper blocks, pulleys, etc. In addition to the differences in end use, there is a difference in processing conditions in that lower lactams may be polymerized at considerably lower temperatures than the higher lactams.

An example of a lower lactam which is suitable for employment in this invention is pyrrolidone.

At the present time epsilon caprolactam is the most important member of the lactams having six to twelve carbon atoms in the lactam ring. However, this invention is also applicable to other higher lactams, examples of which are methyl cyclohexanone isoximes, cycloheptanone isoximes, cyclooctanone isoximes, cyclopentadecanone isoximes, cyclic hexamethylene adipamide, etc.

The anionic or base catalysts suitable for employment in this invention are lactam-base salts obtained by reaction between lactam monomer and certain basic materials. Such lactam-base salts are described in U.S. Patent No. 3,017,391. Ordinarily, the base will be selected from the group consisting of alkali and alkaline earth metals, and certain reaction inorganic compounds thereof, such as their hydrides, fluorohydrides, oxides, hydroxides, carbonates, etc. Also useful are the organometallic compounds of such metals, such as the lithium, potassium, sodium alkyls, Grignard reagents, quaternary ammonium compounds, etc. The concentration may be the same as that used in the prior known processes, and may range anywhere from a fraction of a percent to as much as 15 to 20%, based on the weight of total monomer being polymerized. Preferably, the concentration is kept on the low side, e.g. from about 0.02 to 1.5%.

The anionic catalyst, that is, the lactam base salt, may be prepared by heating "anhydrous" lactam with a base at a temperature between about 25° and 225° C. The time required for this step of the process depends upon the strength of the base employed, the proportion added, and the temperature chosen, and can be from a few seconds to several hours.

As stated above, the promoter employed in the process of this invention comprises the reaction product of an organic isocyanate and water. Organic isocyanates suitable for forming the promoter used in this invention may be selected from the group consisting of alkyl isocyanates, such as methyl isocyanate, ethyl isocyanate, n-propyl isocyanate, isopropyl isocyanate, n-butyl isocyanate, sec-butyl isocyanate and higher homologs thereof; aryl isocyanates, such as phenyl isocyanate, tolyl isocyanates, xylyl isocyanates, ethylphenyl isocyanates, phenethyl isocyanate, p-diphenyl isocyanate, etc.; diisocyanates such as p-phenylene diisocyanate, 2,4-tolylene diisocyanate, di(p - isocyanatophenyl)methane, 2,2 - di(p - isocyanatophenyl) propane, p,p'-diisocyanatodiphenyl, ethylene diisocyanates, N-N-di(isocyanatoethyl)amine, etc.; tri- and polyisocyanates such as 1,3,5-triisocyanatobenzene, 1,3,8-triisocyanatonaphthalene, tri - (p - isocyanatophenyl) methane, 4-(p-isocyanatobenzyl)-1,3-phenylene diisocyanate, 2,5-di(p-isocyanatophenyl) phenyl isocyanate, 2,4-di(p-isocyanatobenzyl) phenyl isocyanate, etc.

The amount of organic isocyanate and water used in forming the promoter can be varied considerably. However, sufficient isocyanate must be employed to reduce the water content of the monomer below about 50 p.p.m., otherwise, there may be water present in an amount which will poison the catalyst.

In polymerizing lactams to polyamides, generally the monomer is divided into two portions, one containing the catalyst and the other the promoter. To carry out the polymerization reaction, the two portions are combined and heated to polymerization temperatures. The weight ratio of the first portion containing catalyst to the second containing promoter may vary from about 3:1 to about 1:6. Although the rate of polymerization varies somewhat depending upon the particular ratio selected, within the above ratios the polymerization ordinarily will progress at a commercially feasible rate.

That portion of the lactam to which a base is added to form the catalyst should be substantially "anhydrous" for, as noted above, water present in greater amounts reacts with the base or lactam-base salt thereby either preventing formation of or deactivating the catalyst. As will be noted from the below discussion, the moisture content of the monomer to which the base is added may be reduced in the necessary degree in the preparation of the promoter.

Advantageously, however, according to this invention that portion of the monomer containing the promoter need not be "anhydrous" and, in fact, should contain more than about 75 p.p.m. of water in order that there be sufficient water present to react with isocyanate to form the promoter. Thus, that portion of the lactam monomer to which the organic isocyanate is added may contain from about 75 to about 1500 p.p.m. of water, preferably from about 400 to about 1200 p.p.m. The amount of organic isocyanate employed should be sufficient to reduce the water content of that portion of the lactam monomer to which it is added to less than about 50 p.p.m. Preferably a small excess of organic isocyanate over the amount required to reduce the water content below 50 p.p.m. is employed. Ordinarily the total quantity of isocyanate used will be in the range between about 0.05 and 1.5 percent, based on total weight of lactam to be polymerized, i.e. the total weight of both the portion containing the catalyst and the portion containing the promoter.

Rather than dividing the monomer into two portions, the base can be added to the total lactam which is to be polymerized after the water content of the monomer has been reduced to less than about 50 p.p.m. in the formation of promoter by reaction between isocyanate and water. By using this procedure it is apparent that the use of more costly "anhydrous" lactam can be avoided. Preferably, however, the lactam monomer is diivded into two portions, one containing catalyst and the other containing promoter, as noted above.

Other well known promoters for the anionic polymerization of lactams to polyamides may be used in conjunction with the novel promoter of this invention comprising the reaction product of an isocyanate and water. These additional or co-promoters include carbon monoxide; carbodimides; cyanamides; N-substituted imides such as succinimides, phthalimides, N,N'-diacetylmethyl aniline, isocyanuric esters, N-propionyl-saccharin, acetyl pyrrolidone, and N-acetyl-ε-caprolactam; N-acetyl sulfonamides; disulfonamides; N-nitrosoamides-acetyl thiohydantoins; ketenes, phosgene; acid chlorides; acid anhydrides; esters such as polyvinyl acetate and diethyl adipate; amides such as acetanalide; sulfonamides; urethanes; ureas; monoacyl amino carboxylic acid esters; N,N'-substituted ureas; glycerol or pentaerythritol triethylcarbonates; sorbitol derivatives; symmetrical triazines such as triphenoxytriazine (TPT); dilactim ethers; polymeric fluoromethylene sulfides; halogenated cycloalkanones; alkanones; benzimido compounds; and polycarbonates, such as poly[2,2-propanebis (4-phenyl carbonate)] having a molecular weight of about 20,000.

A particularly preferred co-promoter for use according to the process of this invention is triphenoxytriazine.

The amount of co-promoter which may be used will depend upon the particular co-promoter selected. Ordinarily, the co-promoter will be present in the same or a somewhat smaller amount than that which would be used were the co-promoter employed alone. With symmetrical triazines, such as triphenoxytriazine, from about 0.02 to about 3.0 percent, based on total weight of monomer to be polymerized may be used to advantage. If the co-promoter is sensitive to water it should be added after sufficient isocyanate has been added to reduce the water content of the lactam monomer to less than about 50 p.p.m.

Generally, the anionic polymerization process of this invention can be carried out at temperatures above the melting point of the lactam monomer but below the melting point of the resulting polyamide. In general, this temperature range is from about 25° C. to about 200° C., depending upon the particular lactam employed. With lactams containing less than six carbon atoms in the lactam ring, the preferred temperature of polymerization is below 150° C. ε-Caprolactam is readily polymerized by the process of this invention at temperatures between 100° and 200° C. with 160° C. being a convenient operating temperature.

The advantage of the process of this invention in providing polyamides of higher density is illustrated in FIG. 1. The catalyst was obtained using 0.06 percent lithium hydride, based on total weight of ε-caprolactam monomer employed. The promoter was obtained using 0.17 percent 2,4-toluene diisocyanate, based on total weight of ε-caprolactam monomer. That portion of the monomer to which the toluene diisocyanate was added contained various amounts of water from 50 p.p.m. to 1500 p.p.m. It is apparent that with 0.17 percent isocyanate, highest densities are obtained with lactam monomer containing from about 400 to about 1200 p.p.m. water, an extremely high density being obtained with a lactam containing about 800 p.p.m. water.

The following examples will serve to further illustrate the practice of the present invention and the benefits derived therefrom.

Example I

Epsilon caprolactam monomer containing less than about 50 p.p.m. water was divided into two portions, and 0.18% of lithium hydride, based on weight of monomer comprising the first portion, was added to the first monomer portion. 2,4-toluene diisocyanate was added to the second monomer portion in an amount providing 0.34% of the isocyanate, based on the weight of the second monomer portion.

The first and second monomer portions were blended in the weight ratio of 1 part, by weight, of the first monomer portion to 3 parts of the second monomer portion and the resulting mixture was maintained at a polymerization temperature of 175° C. for 60 minutes. A plug of the polymer was removed and found to have a density of 1.146.

Example II

The procedure of Example I was repeated with the exception that the monomer mixture formed by combining the first and second monomer portions was maintained at a polymerization temperature of 175° C. for 180 minutes. The polymer was found to have a density of 1.147.

Example III

Lithium hydride was added to epsilon caprolactam monomer containing less than 50 p.p.m. of water in an amount providing 0.12% lithium hydride, based on weight of lactam monomer. 2,4-toluene diisocyanate was added to another portion of epsilon caprolactam monomer containing 200 p.p.m. water in an amount providing 0.34% of isocyanate, based on weight of monomer.

The two monomer portions were blended in the proportions of 1 part by weight of the former to 3 parts of the latter and the resulting mixture was heated at 175° C. for 60 minutes.

A plug of the polymer was taken and found to have a density of 1.152.

Example IV

The procedure of Example III was repeated with the exception that the second monomer portion to which the 2,4-toluene diisocyanate was added contained 600 p.p.m. water. The density of the resultant polymer was found to be 1.152.

Example V

The procedure of Example III was repeated with the exception that lithium amide was substituted for lithium hydride. The polymer had a density of 1.150.

A comparison of the results set forth in Examples III, IV and V, which illustrate the process of this invention, with those set forth in Examples I and II, where the promoter is an isocyanate, shows that substantially increased densities are obtainable by means of this invention.

Example VI

The procedure of Example III was repeated using ethyl isocyanate in place of toluene diisocyanate. The density of the polymer was 1.153.

Example VII

The procedure of Example III was repeated using phenyl isocyanate in place of toluene diisocyanate. The density of the polymer was 1.152.

Example VIII

The procedure of Example III is repeated using 1,3,8-triisocyanatonaphthalene in place of toluene diisocyanate.

Example IX

The procedure of Example III was repeated using polymethylene polyphenyl isocyanate in place of toluene diisocyanate. The density of the polymer was 1.151.

Example X

The procedure of Example III was repeated using dianisidine diisocyanate in place of toluene diisocyanate. The density of the polymer was 1.152.

Example XI

Lithium hydride was added to epsilon caprolactam containing less than 50 p.p.m. of water in an amount providing 0.12% lithium hydride, based on weight of lactam monomer.

2,4-toluene diisocyanate was added to several separate portions of the same monomer containing 105, 210, 420, 615, and 800 p.p.m. water, respectively, in an amount providing 0.34% of isocyanate, based on weight of monomer.

In addition 0.60% of triphenoxytriazine was added to each of the monomer batches to which the isocyanate had been added.

Portions of the monomer to which lithium hydride had been added were blended with each of the separate portions to which isocyanate and triphenoxytriazine had been added and each of the resulting mixtures was heated at approximately 175° C. for 60 minutes. The polymer densities obtained are recorded in Table II below:

TABLE II

| Monomer water content, p.p.m.: | Density |
|---|---|
| 105 | 1.148 |
| 210 | 1.152 |
| 420 | 1.153 |
| 615 | 1.153 |
| 800 | 1.151 |

Table II illustrates the advantages to be obtained according to this invention utilizing as a promoter the reaction product of an isocyanate and water and a triazine as co-promoter.

In the specification and drawing particular embodiments of the invention are disclosed; however, it is to be understood that the invention is not limited to the details disclosed, but includes all such variations and modifications as fall within the spirit of the invention and the scope of the appended claims.

I claim:

1. A process for polymerizing a lactam containing from 6 to 12 carbon atoms in the lactam ring to a polyamide consisting of adding a base to lactam containing less than about 50 p.p.m. water to provide a first monomer portion containing lactam-base salt catalyst, adding an organic isocyanate to lactam containing from about 200 to about 1400 p.p.m. water in an amount within the range of from about 0.05 to about 1.5 percent, by weight, of total lactam to be polymerized, to reduce the water content thereof below 50 p.p.m. to provide a second monomer portion containing as a polymerization promoter the reaction product of said isocyanate and water in the presence of monomer, combining said first and second monomer portions in the proportions by weight of about 3:1 to about 1:6 of said first portion to said second portion, and heating the resulting mixture to a polymerization temperature of from about 25° to about 200° C., said temperature being above the melting point of said monomer and below the melting point of the resulting polyamide.

2. The process according to claim 1 wherein said monomer portion is obtained using a lactam initially containing from about 400 to about 1200 p.p.m. water.

3. The process according to claim 2 wherein said lactam comprises epsilon caprolactam.

4. The process according to claim 3 wherein said isocyanate comprises 2,4-toluene diisocyanate.

5. The process according to claim 4 wherein said monomer portion contains triphenoxytriazine as a co-promoter.

6. The process of claim 1 wherein the isocyanate is an alkyl isocyanate.

7. The process of claim 6 wherein the isocyanate is ethyl isocyanate.

8. A process for the polymerization of a lactam containing from 6 to 12 carbon atoms in the lactam ring to a polyamide consisting of adding an organic isocyanate to a lactam containing from about 200 to about 1400 p.p.m. water in an amount within the range of from about 0.05 to about 1.5 percent, by weight, of total lactam to be polymerized, to reduce the water content thereof below about 50 p.p.m. and to provide a polymerization promoter through reaction between said isocyanate and water in the presence of monomer, adding a base to said lactam monomer to form in situ a lactam-base salt catalyst, and heating said lactam monomer to a polymerization temperature of from about 25° to about 200° C., said temperature being above the melting point of said lactam and below the melting point of the resulting polyamide.

9. The process according to claim 8 wherein said monomer initially contains from about 400 to about 1200 p.p.m. of water.

10. The process according to claim 4 wherein said monomer comprises epsilon caprolactam.

11. The process according to claim 14 wherein said isocyanate comprises 2,4-toluene diisocyanate.

12. The process according to claim 11 wherein said monomer contains triphenoxytriazine as a co-promoter.

13. The process of claim 8 wherein the isocyanate is an alkyl isocyanate.

14. The process of claim 13 wherein the isocyanate is ethyl isocyanate.

References Cited

UNITED STATES PATENTS

| | | | |
|---|---|---|---|
| 2,907,755 | 10/1959 | Lautenschlager et al. | 260—78 |
| 3,017,391 | 1/1962 | Mottus et al. | 260—78 |
| 3,017,392 | 1/1962 | Butler et al. | 260—78 |
| 3,028,369 | 4/1962 | Butler et al. | 260—78 |
| 3,093,618 | 6/1963 | Graf et al. | 260—78 |
| 3,138,574 | 6/1964 | Kohan | 260—78 |
| 3,216,976 | 11/1965 | Schwartz et al. | 260—78 |
| 3,234,152 | 2/1966 | Fuller | 260—78 |
| 3,309,343 | 3/1967 | Darnell et al. | 260—78 |

FOREIGN PATENTS 900,151 7/1962 Great Britain.

HAROLD D. ANDERSON, *Primary Examiner.*

U.S. Cl. X.R.

260—78

PO-1050
(5/69)

UNITED STATES PATENT OFFICE
CERTIFICATE OF CORRECTION

Patent No. 3,440,227            Dated  April 22, 1969

Inventor(s) Bernard O. Baum

It is certified that error appears in the above-identified patent and that said Letters Patent are hereby corrected as shown below:

Column 1, line 42, for "capralactam" read -- caprolactam --.
Column 2, line 8, for "lactum" (both occurrences) read
              --lactam--.
Column 3, line 5, for "dennsity" read -- density --.
Column 5, line 41, after "N-nitrosoamide" insert a semicolon (;
Column 7, line 72, after "below" insert -- about --.
Column 8, line 43, for "4" read -- 9 --; line 45, for "14"
              read -- 10 --.

SIGNED AND
SEALED
FEB 3 1970

(SEAL)
Attest:

Edward M. Fletcher, Jr.          WILLIAM E. SCHUYLER, JR.
Attesting Officer              Commissioner of Patents